(12) United States Patent
Mosebach et al.

(10) Patent No.: US 11,940,801 B2
(45) Date of Patent: Mar. 26, 2024

(54) AUTOMATICALLY MOVING FLOOR TREATMENT APPLIANCE COMPRISING A PLURALITY OF FALL SENSORS

(71) Applicant: Vorwerk & Co. Interholding GmbH, Wuppertal (DE)

(72) Inventors: Andrej Mosebach, Unna (DE); Henning Hayn, Hilden (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 321 days.

(21) Appl. No.: 17/540,380

(22) Filed: Dec. 2, 2021

(65) Prior Publication Data

US 2022/0179427 A1 Jun. 9, 2022

(30) Foreign Application Priority Data

Dec. 3, 2020 (DE) ...................... 10 2020 132 203.8

(51) Int. Cl.
  *G05D 1/02* (2020.01)
  *A47L 9/00* (2006.01)
  *A47L 9/28* (2006.01)
  *A47L 11/10* (2006.01)
  *A47L 11/28* (2006.01)
  *A47L 11/40* (2006.01)
  *G05D 1/00* (2006.01)

(52) U.S. Cl.
  CPC ............ *G05D 1/0214* (2013.01); *A47L 9/009* (2013.01); *A47L 9/2805* (2013.01); *A47L 9/2852* (2013.01); *A47L 11/10* (2013.01); *A47L 11/28* (2013.01); *A47L 11/4002* (2013.01); *A47L 11/4011* (2013.01); *A47L 11/4061* (2013.01); *A47L 11/4066* (2013.01); *A47L 2201/04* (2013.01); *G05D 2201/0203* (2013.01); *G05D 2201/0215* (2013.01)

(58) Field of Classification Search
  None
  See application file for complete search history.

(56) References Cited

U.S. PATENT DOCUMENTS

| 2008/0276408 | A1* | 11/2008 | Gilbert, Jr. | A47L 11/4066 134/201 |
| 2017/0344016 | A1* | 11/2017 | Chen | G05D 1/0238 |
| 2018/0178391 | A1* | 6/2018 | Naito | G05D 1/0214 |
| 2018/0368642 | A1* | 12/2018 | Son | A47L 9/2826 |

(Continued)

*Primary Examiner* — James J Lee
*Assistant Examiner* — Wenyuan Yang
(74) *Attorney, Agent, or Firm* — Collard & Roe, P.C.

(57) ABSTRACT

An automatically moving floor treatment appliance has an appliance housing, a drive, a detector for detecting surrounding area features, and a computer that transmits control commands to the drive, based on the surrounding area features detected by the detector. The detector has a plurality of inner and outer fall sensors arranged on an underside of the appliance housing, which detect a distance of the floor treatment appliance from the surface. The computer controls the drive to change a movement of the floor treatment appliance when the distance detected by the fall sensor is greater than a threshold value defining a slope. The fall sensors are interconnected in an evaluation circuit of the detection means so that the detection signals of the totality of inner fall sensors can be evaluated independently of the detection signals of the totality of outer fall sensors.

8 Claims, 4 Drawing Sheets

(56) References Cited

U.S. PATENT DOCUMENTS

2020/0225673 A1* 7/2020 Ebrahimi Afrouzi ........................ G05D 1/0044
2021/0096560 A1* 4/2021 al-Mohssen ......... G05D 1/0038

* cited by examiner

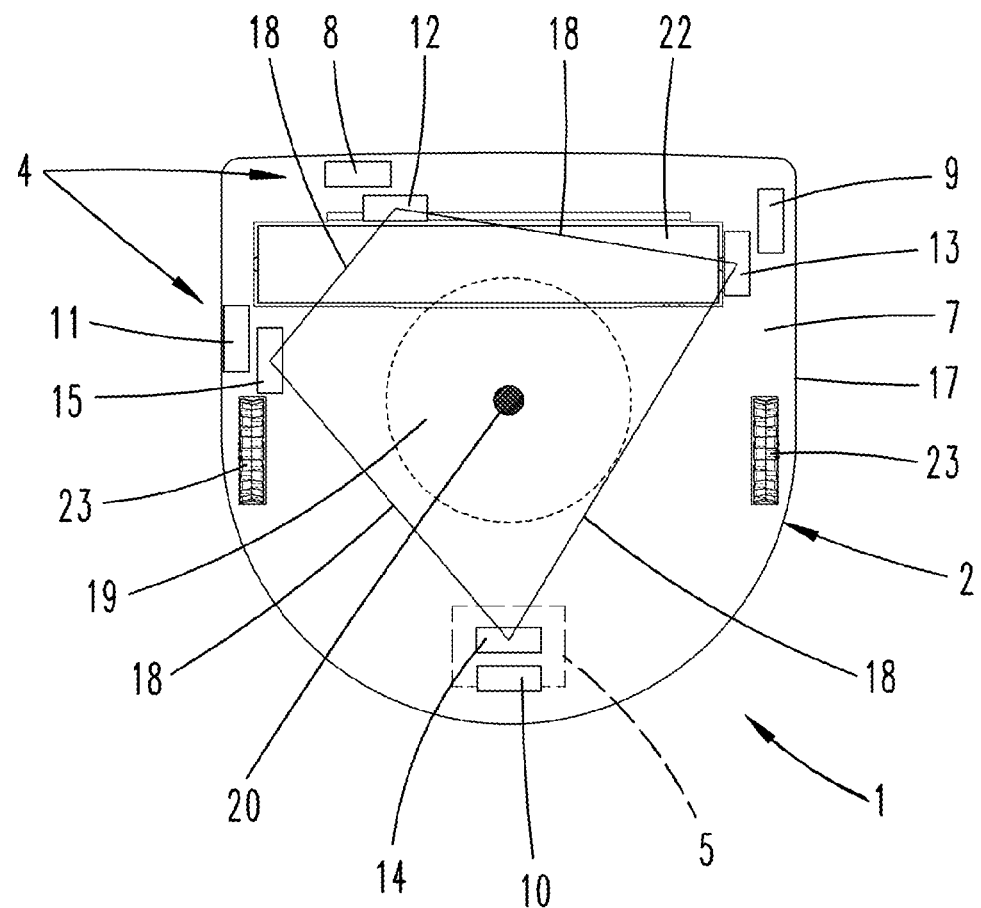

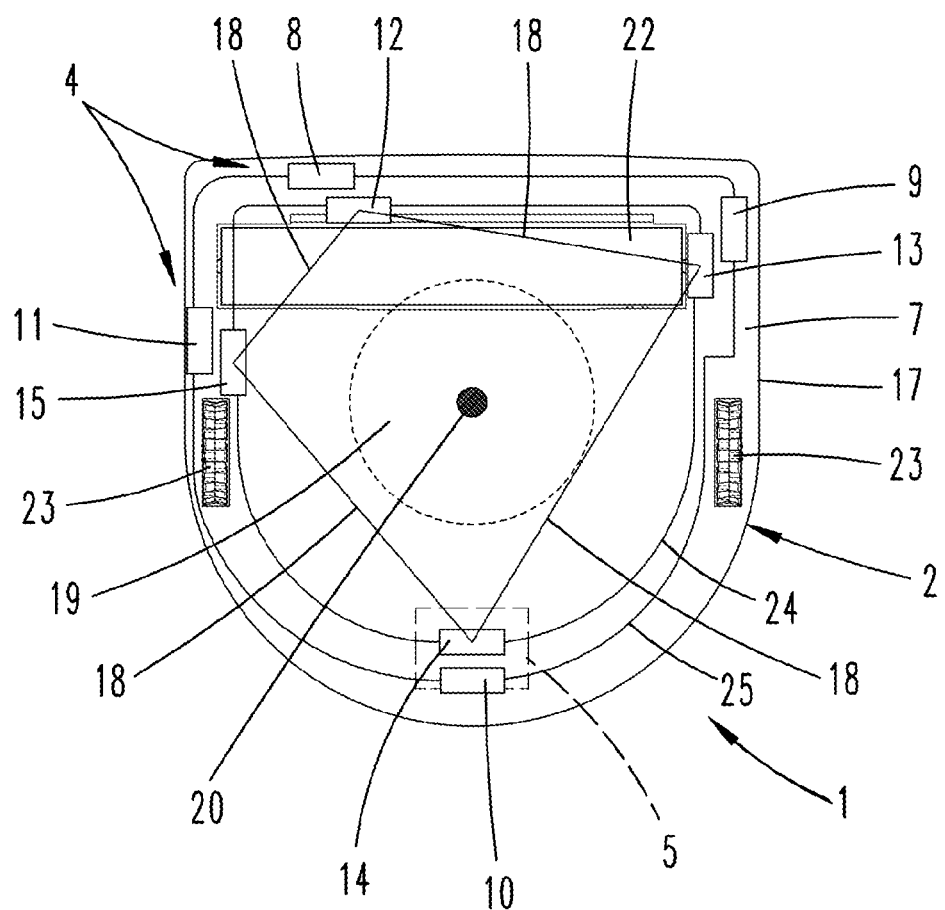

AUTOMATICALLY MOVING FLOOR TREATMENT APPLIANCE COMPRISING A PLURALITY OF FALL SENSORS

CROSS REFERENCE TO RELATED APPLICATIONS

Applicant claims priority under 35 U.S.C. § 119 of German Application No. 10 2020 132 203.8 filed Dec. 3, 2020, the disclosure of which is incorporated by reference.

BACKGROUND OF THE INVENTION

1. Field of the Invention

The invention relates to an automatically moving floor treatment appliance comprising an appliance housing, a drive means for the movement of the floor treatment appliance within a surrounding area, a detection means for detecting surrounding area features within the surrounding area, and a computing means, which is configured to transmit control commands to the drive means, based on the surrounding area features detected by the detection means, wherein the detection means has at least one fall sensor arranged on an underside of the appliance housing facing a surface, which is configured to detect a distance of the floor treatment appliance from the surface, and wherein the computing means is configured to control the drive means to change a movement of the floor treatment appliance when the distance detected by the fall sensor is greater than a threshold value defining a slope.

2. Description of the Related Art

Automatically moving floor treatment appliances are known in the prior art in various embodiments.

The floor treatment appliances are, for example, conventional household appliances or industrially used appliances, which perform a floor treatment activity, such as for example, vacuuming, mopping, polishing, sanding, oiling, or also combinations thereof. According to an embodiment, the automatically moving floor treatment appliance can be, for example, a robot vacuum cleaner, robot mop, or the like. So that the floor treatment appliance does not collide with obstacles, it has a detection means, which can recognize obstacles, such as, for examples, walls, pieces of furniture, decorative objects, or the like, in the surrounding area. The detection means can be, for example, a distance measuring means, which measures distances from obstacles. In the alternative or in addition, the detection means can also have contact sensors, which can detect a contact to an obstacle. The detection means can have a plurality of different sensors, which utilize various technologies to detect the surrounding area features. Common detection means have, for example, laser distance sensors, in particular triangulation sensors, ultrasonic sensors, radar sensors, or the like.

In the case of more highly developed appliances, it is furthermore known that the surrounding area features detected by the detection means are used to generate a surrounding area map, which shows a layout of the surrounding area of the floor treatment appliance and in which the positions of obstacles are noted. Based on the generated surrounding area map, the computing means can determine a current position of the floor treatment appliance in the surrounding area and can optionally plan a movement route through the surrounding area. It is furthermore known that the detection means of the floor treatment appliance also has one or several fall sensors, which measures a distance from a surface and thus optionally detects that the floor treatment appliance moves towards a slope. Such a slope can be, for example, a flight of stairs, an edge region of a step, of a landing, or the like. When the floor treatment appliance moves towards such a slope, the fall sensor, which is arranged on the underside of the appliance housing, reaches beyond the slope and detects the changed, namely, increased distance, from the surface of the floor treatment appliance, namely, for example, the top side of a next step. The computing means of the floor treatment appliance then recognizes the slope and can prompt the floor treatment appliance to perform a change in direction, and can thus prevent the floor treatment appliance from falling down the slope. The floor treatment appliance thus turns at the outer edge of the slope or travels parallel thereto, respectively, and continues its movement. At several positions of its appliance housing, the floor treatment appliance usually has such fall sensors, in order to provide a protection against a fall of the floor treatment appliance in the case of different directions of movement.

Even though the fall sensors have proven themselves in the prior art, there is nonetheless generally the danger that a fall sensor is defective and can no longer detect that the floor treatment appliance approaches a slope. In this case, it could happen that the floor treatment appliance falls down a slope and thereby causes damages or even represents a danger to persons.

SUMMARY OF THE INVENTION

Based on the above-mentioned prior art, it is thus the object of the invention to further improve the operational safety of the floor treatment appliance.

To solve this object, it is proposed that, on the underside of the appliance housing, the automatically moving floor treatment appliance has a plurality of outer fall sensors, which are arranged one behind the other in the direction of a circumferential contour of the underside, and a plurality of inner fall sensors, which, based on the arrangement of the outer fall sensors, are offset inwards, wherein the fall sensors are interconnected in an evaluation circuit of the detection means so that the detection signals of the totality of inner fall sensors can be evaluated independently of the detection signals of the totality of outer fall sensors, wherein the totality of inner fall sensors is integrated in a common first evaluation circuit of the detection means, and wherein the totality of outer fall sensors is integrated in a common second evaluation circuit, which is formed separately from the first evaluation circuit.

According to the invention, the floor treatment appliance thus has a plurality of fall sensors, which, based on the circumferential contour of the underside of the floor treatment appliance, viewed from the outside to a center of the underside of the appliance housing, are arranged in two rows. The second row of fall sensors located on the inside thereby forms a redundancy in the event that a fall sensor of the outer first row of fall sensors is defective and cannot detect a slope. The fall sensors of the floor treatment appliance are thus advantageously arranged in duplicate in two rows located one behind the other viewed in a radial direction of the circumferential contour. It is prevented thereby that in the case of failure of a fall sensor of the first sensor row located closest to the circumferential contour, this leads to a fall of the floor treatment appliance at a slope. A so-called "one error tolerance" of the floor treatment appliance is thus at hand, which requires that the safe operation of the floor treatment appliance is still ensured even when an error occurs.

The fall sensors are interconnected in an evaluation circuit of the detection means so that the detection signals of the inner fall sensors can be evaluated independently of the detection signals of the outer fall sensors. By means of the independent evaluability, a malfunctioning of the fall sensor system can either be assigned to a sensor of the totality of outer fall sensors or to a sensor of the totality of inner fall sensors. A respective detection signal can thereby preferably be assigned to a certain fall sensor, so that the evaluation circuit can specify in a defined manner, whether the inner or outer fall sensors are affected, in particular also information as to which one of the inner or outer fall sensors is defective.

The inner fall sensors are furthermore integrated in a first evaluation circuit of the detection means, while the outer fall sensors are integrated in a second evaluation circuit, which is formed separately from the first evaluation circuit. According to this design, the floor treatment appliance thus has two measuring loops, which can be evaluated independently of one another. Each evaluation circuit includes a separate measuring loop or a separate logic circuit, respectively, which in each case only integrates the inner fall sensors or only the outer fall sensors. In the case of an error in one of the fall sensors, it can thus be determined clearly whether an inner fall sensor or an outer fall sensor is defective, and in the case of an error in one of the evaluation circuits, it can be determined clearly whether an error is present in one of the evaluation circuits by means of a comparison of the detection signals of the fall sensors within the measuring loops and both measuring loops with one another.

It is proposed that the number of the inner fall sensors corresponds to the number of the outer fall sensors. In the case of failure of the respective outer fall sensor, the securing function of an outer fall sensor can thus be perceived by means of an inner fall sensor. Provided that an outer fall sensor fails due to defect, the floor treatment appliance initially moves further towards the slope until the edge of the slope reaches into the detection region of an inner fall sensor. The slope can then be recognized and reacted to accordingly.

It is in particular proposed that the floor treatment appliance has at least three outer fall sensors and at least three inner fall sensors. A formation of the floor treatment appliance comprising four outer fall sensors and four inner fall sensors is particularly preferred. In the case of this formation, a, for example, essentially square floor treatment appliance can be equipped at each side edge of the underside of the appliance with an outer fall sensor each and with an inner fall sensor each. In the case of a floor treatment appliance comprising an essentially circular circumferential contour, based on a top view, the four outer fall sensors or four inner fall sensors, respectively, can preferably be arranged at distances of 90 degrees angular ranges, so that protection against a fall is also provided when the floor treatment appliance moves towards a slope in a forward or reverse travel or travels parallel to an outer edge of the slope. More than four inner and four outer fall sensors can also be used. The protection against a fall is increased thereby even at slopes, which have an irregular edge contour, for example have circumferential regions, which taper in a web-shaped manner, in particular when the web width thereof is less than a distance of two wheels of the floor treatment appliance, which are arranged next to one another in the direction of movement.

According to a particularly preferred embodiment, an inner fall sensor is in each case spatially assigned to an outer fall sensor, based on a position on the underside of the appliance housing, so that the inner fall sensor and the outer fall sensor form a sensor pair. Each outer fall sensor thus has a replacement sensor, which, in the event of a functional failure of the outer fall sensor, takes over the securing function of the floor treatment appliance. The inner fall sensor is thereby preferably in the immediate vicinity of the outer fall sensor, so that in the case of failure of the outer fall sensor, the floor treatment appliance does not cover a relevant distance until the inner fall sensor can detect the slope. Based on a circumferential direction along the circumferential contour of the underside of the appliance housing, the inner fall sensor and the outer fall sensor of the same sensor pair can be arranged directly next to one another. In the alternative, it is also possible that they are offset to one another in the circumferential direction and, for example, the outer fall sensor is thus arranged in front of the inner fall sensor in the circumferential direction, but laterally offset thereto, i.e., in the second row. Based on the radial direction of the circumferential contour, a certain distance can generally lie between the outer fall sensor and the assigned inner fall sensor, which is arranged in the second row, of the same sensor pair. This distance can be, for example, a few millimeters, up to a few centimeters. The further the fall sensors of the same sensor pair are spaced apart based on the radial direction, the later the inner fall sensor can recognize a slope, when the outer fall sensor failed before. The greater the radial distance between the fall sensors of the same sensor pair, the better the detection regions of the outer fall sensor and of the inner fall sensor can be differentiated from one another on the other hand, so that the computing means can determine with certainty that a fall sensor is defective.

In the case of the pairwise arrangement of an inner fall sensor and of an outer fall sensor, it is proposed in particular that the computing means is configured to stop the movement of the floor treatment appliance when the inner fall sensor of a sensor pair detects a slope, even though the outer fall sensor of the same sensor pair has not detected a slope before. In an error-free state of the fall sensors, the outer fall sensor initially detects a distance change to a surface, when the floor treatment appliance approaches a slope, before the assigned inner fall sensor can then likewise detect the distance change in response to continued approaching of the floor treatment appliance in the direction of the slope. When the outer fall sensor now fails, is defective, or indicates an incorrect detection value, the computing means can optionally not draw a conclusion to the presence of a slope in the detection region of the outer fall sensor. In that case, the computing means of the floor treatment appliance does not prompt a change in direction. The floor treatment appliance thus continues its movement and heads for the slope, until the slope reaches the detection region of the inner fall sensor. If the latter can now detect a slope, the computing means draws the conclusion that the outer fall sensor, which is arranged upstream in the direction of movement, is defective. In that case, the safety measure of the floor treatment appliance takes effect, and the computing means stops the drive means of the floor treatment appliance, thus resulting in a standstill. A safety shutdown of the floor treatment appliance or at least a safety shutdown of the drive means, respectively, thus takes place, so that a fall of the floor treatment appliance at the slope is prevented.

It can be provided that the computing means is configured to transmit an error signal to a user of the floor treatment appliance when the inner fall sensor of a sensor pair detects a slope, while the outer fall sensor of the same sensor pair does not detect a slope. In the alternative or in addition, the computing means can thus send an error case to a user of the floor treatment appliance, instead of or in addition to the stopping of the movement of the floor treatment appliance. According to an embodiment, the drive means of the floor treatment appliance can be stopped immediately and an error signal can then be transmitted to the user. In the alternative, however, it is also possible that the floor treatment appliance is initially further operated, under the condition that the inner fall sensor now takes over the securing function of the assigned defective fall sensor. The error signal, i.e. the information relating to the error of the fall sensor system, can then inform the user that the user should have the floor treatment appliance checked by a specialized company with regard to the functional safety. The error signal can be reported to the user in the form of acoustic or optical information. For example, the floor treatment appliance can have a loudspeaker or a display, which outputs the error, which occurred, in speech or text form. It is furthermore also possible that the floor treatment appliance has a communication interface, which transmits the error signal to an external end device of the user, which is in communication with the floor treatment appliance. For example, the external end device can be a mobile telephone, a tablet computer, or another mobile or stationary device of the user, which is suitable to receive the error signal and to bring it to the attention of the user. It is in particular proposed that the external end device of the user has an application, which is optimized for the communication with the floor treatment appliance, in particular the computing means thereof. The user can, for example, also transmit control commands to the computing means of the floor treatment appliance via the application.

It is proposed that the inner fall sensors are arranged on the underside of the appliance housing so that a straight connecting line between two inner fall sensors, which are arranged one behind the other in the circumferential direction of the circumferential contour, does not intersect, in particular also does not affect, a center of gravity region defined on the underside, which has a vertical projection of the center of mass of the floor treatment appliance into the plane of the fall sensors. According to this design, the inner fall sensors and thus also the outer fall sensors are arranged around a vertical projection of the center of mass into the sensor plane so that straight connecting lines between fall sensors, which in each case lie one behind the other in the circumferential direction, do not intersect or touch the defined center of gravity region. Based on the vertical projection of the center of mass, the center of gravity region is defined so that a fall of the floor treatment appliance at a slope is likely when an outer edge of the slope penetrates into the defined center of gravity region, i.e. lies vertically below the latter. An impending fall situation is thus recognized in time when the slope is detected, as long as the center of gravity region is not yet located above the outer edge of the slope. Based on a viewing direction onto the floor treatment appliance, in the case of which the observer looks vertically from the top onto the floor treatment appliance standing on the surface, the center of mass of the floor treatment appliance preferably lies centrally within the defined center of gravity region. When the inner fall sensors are arranged on the appliance housing outside of the defined center of gravity region so that an imaginary straight connecting line between successive fall sensors does not intersect the center of gravity or is additionally also does not affect it, the floor treatment appliance cannot fall over a slope with a likewise rectilinear outer edge. On the contrary, the outer edge of the slope would first reach into the detection region of an inner fall sensor (and also outer fall sensor) before the center of mass of the floor treatment appliance lies relative to the slope so that the floor treatment appliance would lose its balance. The defined center of gravity region can thus also be identified as fall region, in which the presence of an outer edge of a slope would likely lead to a tilting of the floor treatment appliance.

It is in particular proposed in this context that the center of gravity region is formed in a circular manner and the center of mass projected onto the underside of the appliance housing defines the center point of the circular center of gravity region. According to this design, the projection of the center of mass, which lies in the sensor plane, is located exactly in the center of the circular center of gravity region and thus forms the center of the circle. The inner fall sensors and optionally also outer fall sensors can be arranged regularly or irregularly around the circular center of gravity region, wherein the condition that a straight connecting line between fall sensors following one another is not a tangent, secant, or passant of the circular shape, is then also met.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows a bottom view of the floor treatment appliance;

FIG. 5 shows the floor treatment appliance in a bottom view with a first evaluation circuit and a second evaluation circuit.

DETAILED DESCRIPTION OF PREFERRED EMBODIMENTS

Figure 1:
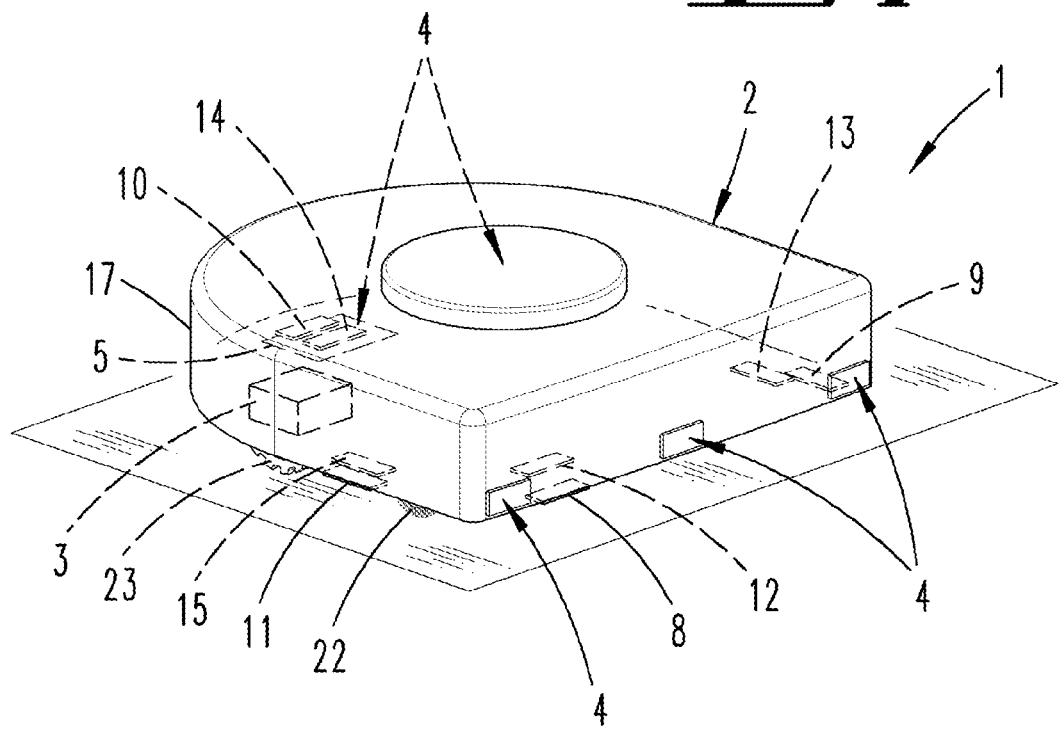
FIG. 1 shows a floor treatment appliance according to the invention.

FIG. 1 shows a floor treatment appliance 1 according to the invention in an exemplary manner, which is formed here as automatically moving robot cleaner. The floor treatment appliance 1 has an appliance housing 2 and a drive means 3, which serves to drive wheels 23 arranged on an underside 7 of the appliance housing 2. The floor treatment appliance 1 has a non-illustrated accumulator, which serves for an energy supply for the drive means 3 as well as for further electrical consumers of the floor treatment appliance 1. Here, the drive means 3 has, for example, an electric motor, which is not illustrated in more detail. A cleaning element 22, which is formed here as rotating bristle roller, is furthermore movably supported on the appliance housing 2. The floor treatment appliance 1 can furthermore have a blower (not illustrated), in order to be able to transfer, for example, suction material into a suction material collecting container. Alternatively to the formation as vacuum cleaning appliance, however, the floor treatment appliance 1 can also be formed as any other automatically moving floor treatment appliance 1, for example as mopping appliance, polishing appliance, or the like.

So that the floor treatment appliance 1 can move on a surface 6 without collision with obstacles, the floor treatment appliance 1 has a detection means 4 as well as a computing means 5, which is formed to evaluate the signals detected by the detection means 4. Here, the detection means 4 has several sub-means, which serve for the detection of surrounding area features. On the one hand, the detection means 4 includes a distance measuring means, which measures distances from obstacles, which are present in the surrounding area. Here, the distance measuring means is formed, for example, as laser distance measuring means, in particular triangulation means, comprising a 360° light exit opening, which is arranged on the top side of the appliance housing 2. The distance values detected by the distance measuring means are used by the computing means 5 in order to generate a surrounding area map, which, in addition to a layout of the surrounding area, for example a room or an apartment, additionally also includes positions and dimensions of obstacles, which are present in the room or the apartment, respectively. The computing means 5 of the floor treatment appliance 1 uses the generated surrounding area map for the navigation and self-localization within the surrounding area. In particular a current position and orientation of the floor treatment appliance 1 can be determined, and, for example, a traveling route through the surrounding area can be planned, which is free from obstacles. The floor treatment appliance 1 furthermore has, as part of the detection means 4, infrared sensors, which are arranged frontally on the appliance housing 2. The infrared sensors serve for the detection of obstacles in the near region and thus also to avoid collisions. The detection means 4 furthermore includes fall sensors 8, 9, 10, 11, 12, 13, 14, 15, which can detect a slope 16 on the surface 6. For this purpose, the fall sensors 8, 9, 10, 11, 12, 13, 14, 15 detect a distance a, which specifies a height change of the surface 6. The computing means 5 evaluates the detected distance a by means of a comparison with a defined threshold value. Provided that the detected distance a is greater than the defined threshold value, a conclusion is drawn that the floor treatment appliance 1 is located at a slope 16 of the surface 6. To protect the floor treatment appliance 1 against falling over the slope 16 from all directions and thus also in any directions of movement, the fall sensors 8, 9, 10, 11, 12, 13, 14, 15 are arranged along a circumferential contour 17 of the underside 7 of the appliance housing 2.

Figure 2:
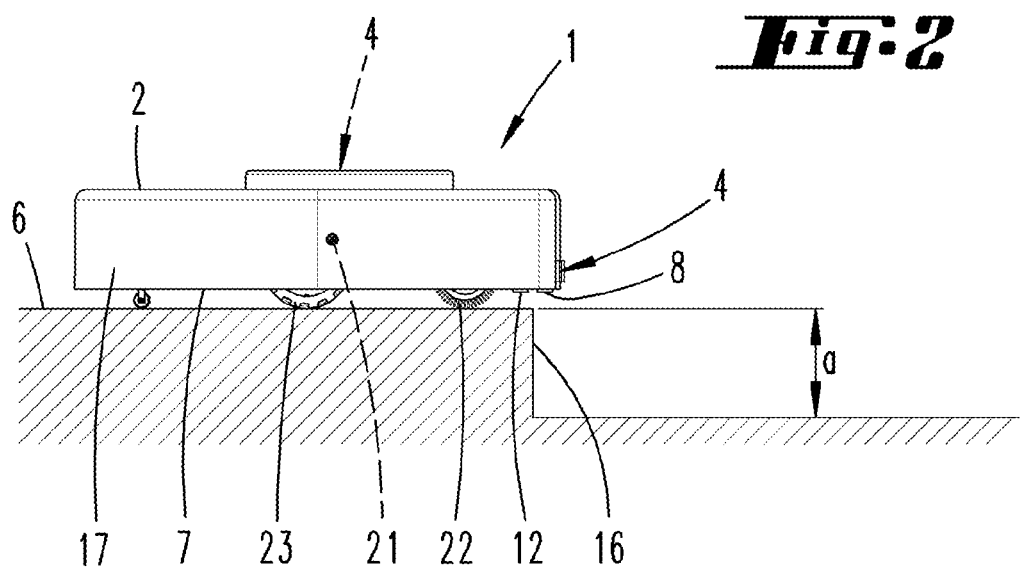
FIG. 2 shows the floor treatment appliance in a side view in front of a slope.

FIG. 2 shows a side view of a floor treatment appliance 1 standing in front of a slope 16. The slope 16 has a height, i.e. a distance a between two different planes of the surface 6, which, in the case of a fall of the floor treatment appliance 1, could likely lead to damage of the surface 6 and/or of the floor treatment appliance 1. Slopes 16 of this type can be, for example, steps. The computing means 5 differentiates slopes 16 on the basis of the defined threshold value, so that slightly height changes, for example at carpet edges, doorsteps, and the like are not classified as being dangerous. However, there is the risk at the slope 16 illustrated here, for example, that the floor treatment appliance 1 tilts and falls down the slope 16 in response to continued movement in the direction of the slope 16 due to a displacement of the center of mass 21 of the floor treatment appliance 1.

FIG. 3 shows the underside 7 of the floor treatment appliance 1 comprising the fall sensors 8, 9, 10, 11, 12, 13, 14, 15, which are arranged along the circumferential contour 17 of the appliance housing 2. The fall sensors 8, 9, 10, 11, 12, 13, 14, 15 are arranged in two rows, namely in an outer row, which has four outer fall sensors 8, 9, 10, 11, and an inner row, which includes four inner fall sensors 12, 13, 14, 15. An inner fall sensor 12, 13, 14, 15 is thereby in each case assigned to each outer fall sensor 8, 9, 10, 11, so that sensor pairs form. Here, sensor pairs are formed from the outer fall sensor 8 and the inner fall sensor 12, the outer fall sensor 9 and the inner fall sensor 13, the outer fall sensor 10 and the inner fall sensor 14, as well as the outer fall sensor 11 and the inner fall sensor 15. Each pair of fall sensors 8, 9, 10, 11, 12, 13, 14, 15 is thereby essentially assigned to one side of the circumferential contour 17, in order to secure the floor treatment appliance 1 against slopes 16, which are present in the surrounding area, in four different directions. FIG. 3 furthermore represents a defined center of gravity region 19, which defines a circular region around a projection 20 of the center of mass 21 into the plane of the fall sensors 8, 9, 10, 11, 12, 13, 14, 15, which is formed on the underside 7. When looking at the floor treatment appliance 1 from the bottom or top (in the case of horizontal orientation of the appliance housing 2 and vertical view onto the appliance housing 2), the center of mass 21 and the projection 20 thereof are located one on top of the other. The center of gravity region 19 defined around the projection 20 is dimensioned so that straight connecting lines 18 between inner fall sensors 12, 13, 14, 15, which follow one another along the circumferential contour 17, do not touch the circular center of gravity region 19. Here, straight connecting lines 18 are defined between the inner fall sensors 12 and 13, 13 and 14, 14 and 15, as well as 15 and 12, which follow one another. These straight connecting lines 18 evidently do not intersect or touch the center of gravity region 19. The center of gravity region 19 is dimensioned so that no danger of falling at a slope 16 exists for the floor treatment appliance 1, as long as an outer edge of the slope 16 does not yet engage with this center of gravity region 19, i.e., does not yet lie below the center of gravity region 19 in the case of horizontal orientation of the floor treatment appliance 1. Provided that the floor treatment appliance 1 moves further in the direction of the slope 16, however, and the center of gravity region 19 already lies partially over the slope 16, there is a large risk that the floor treatment appliance 1 tilts over the slope 16. The arrangement of the fall sensors 8, 9, 10, 11, 12, 13, 14, 15 on the underside 7 prevents that the floor treatment appliance 1 even moves that far in the direction of the slope 16 and a dangerous situation thus results.

The vicinity of the center of gravity region 19 on the underside 7 of the appliance housing 2 is monitored by means of the fall sensors 8, 9, 10, 11, 12, 13, 14, 15, which span the straight connecting lines 18 around the center of gravity region 19. The second sensor row, which includes the inner fall sensors 12, 13, 14, 15, thereby serves as fail safe for the outer fall sensors 8, 9, 10, 11. For example, the inner fall sensor 12 secures the floor treatment appliance 1 against a fall at a slope 16 during a conventional forward movement of the floor treatment appliance 1, when the assigned outer fall sensor 8 fails, or produces a wrong detection result. The inner fall sensor 13 can likewise replace the outer fall sensor 9. The inner fall sensor 14 therefore forms a redundancy for the outer fall sensor 10, the inner fall sensor 15 can likewise replace the outer fall sensor 11.

The mode of operation of the fall sensors 8, 9, 10, 11, 12, 13, 14, 15 during a forward movement of the floor treatment appliance 1 in the direction of a slope 16 will be described below on the basis of FIGS. 4A, 4B, and 4C. According to FIG. 4A, the appliance housing 2 of the floor treatment appliance 1 is still located completely in front of the slope 16. According to FIG. 4B, the appliance housing 2 is already pushed partially over the slope 16, namely so that a subsection of the circumferential contour 17 protrudes beyond the slope 16. In FIG. 4C, the appliance housing 2 is pushed even further over the slope 16.

Figure 4A:
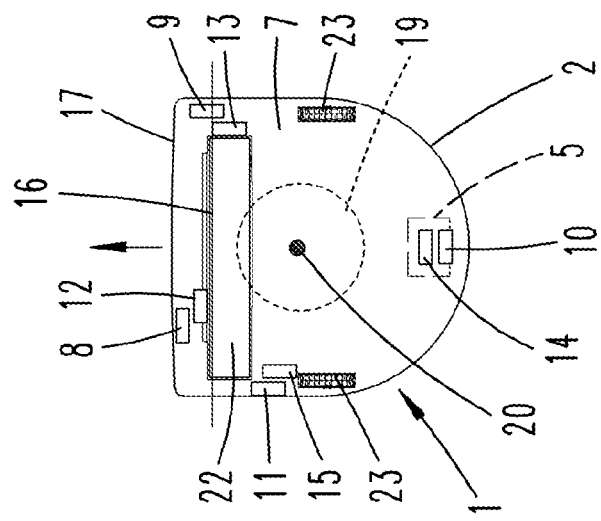
FIG. 4A shows the floor treatment appliance in a bottom view when approaching a slope.
Figure 4B:
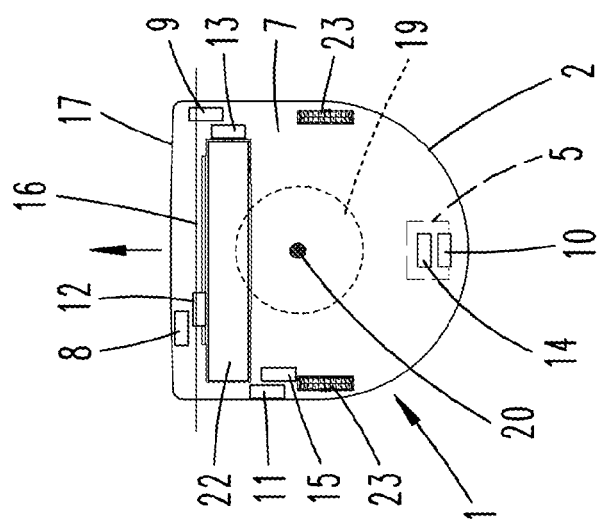
FIG. 4B shows the floor treatment appliance according to FIG. 4A when partially passing over the slope.
Figure 4C:
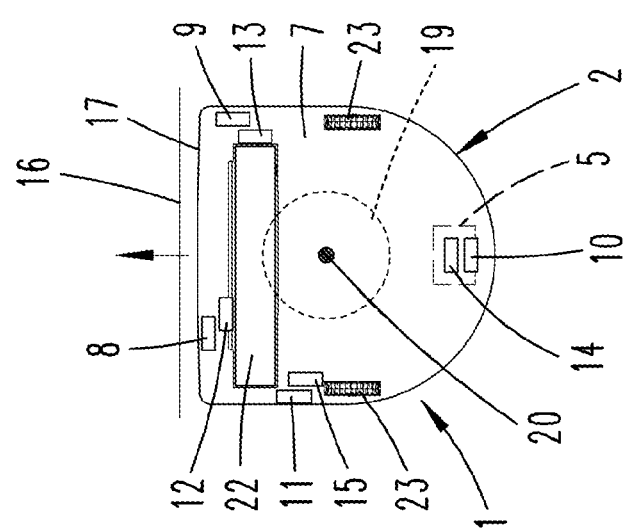
FIG. 4C shows the floor treatment appliance according to FIGS. 4A and 4B when continuing to pass over the slope.

In the situation according to FIG. 4A, none of the fall sensors 8, 9, 10, 11, 12, 13, 14, 15 detects the slope 16 yet. The floor treatment appliance 1 thus initially moves further towards the slope 16, namely in the direction of movement suggested by means of an arrow. As soon as the floor treatment appliance 1 protrudes at least partially with the circumferential contour 17 over the slope 16, the outer edge of the slope 16 ends up in the detection region of the outer fall sensor 8 (FIG. 4B), which leads in the direction of movement. Provided that the fall sensor 8 works without error, the computing means 5 can determine the presence of the slope 16 and can control the drive means 3 of the floor treatment appliance 1 so that the direction of movement is changed, namely away from the slope 16. In the example shown here, it is assumed, however, that the outer fall sensor 8, which is located closest to the circumferential contour 17 of the appliance housing 2 in the driving direction, is defective, and the computing means 5 can thus not recognize that the appliance housing 2 has already pushed partially over the slope 16. Due to the fact that the inner fall sensor 12 assigned to the outer fall sensor 8 is not yet located over the slope 16, said inner fall sensor cannot yet recognize the slope 16. The movement of the floor treatment appliance 1 over the slope 16 is thus continued, until the position shown in FIG. 4C is reached. In the case of this position, the outer edge of the slope 16 is located within the detection region of the inner fall sensor 12, which serves as replacement for the outer fall sensor 8. The computing means 5 recognizes that the appliance housing 2 is already partially located over the slope 16, and stops the drive means 3 of the floor treatment appliance 1 well before the center of gravity region 19 of the appliance housing 2 lies over the slope 16. The floor treatment appliance 1 is thus reliably secured against a fall over the slope 16. In addition to stopping the drive means 3, the computing means 5 furthermore preferably also prompts the output of information to a user of the floor treatment appliance 1, so that said user is informed that an error case has occurred and the floor treatment appliance 1 should be checked.

FIG. 5 shows the underside 7 of the floor treatment appliance 1 according to FIG. 3 with the fall sensors 8, 9, 10, 11, 12, 13, 14, 15. The totality of inner fall sensors 12, 13, 14, 15 is integrated in a common first evaluation circuit 24 of the detection means 4, whereas the totality of outer fall sensors 8, 9, 10, 11 is integrated in a common second evaluation circuit 25 which is formed separately from the first evaluation circuit 24. Thereby the detection signals of the totality of inner fall sensors 12, 13, 14, 15 can be evaluated independently of the detection signals of the totality of outer fall sensors 8, 9, 10, 11. By means of the independent evaluability, a malfunctioning of the fall sensor system can either be assigned to an inner fall sensor 12, 13, 14, 15 of the first evaluation circuit 24 or an outer fall sensor 8, 9, 10, 11 of the second evaluation circuit 25. A respective detection signal can preferably be assigned to a certain outer fall sensor 8, 9, 10, 11 or a certain inner fall sensor 12, 13, 14, 15, so that the first evaluation circuit 24 or the second evaluation circuit 25, respectively, can specify, whether the inner fall sensors 12, 13, 14, 15 or the outer fall sensors 8, 9, 10, 11 are affected, in particular also information as to which one of the inner fall sensors 12, 13, 14, 15 or which one of outer fall sensors 8, 9, 10, 11 is defective. According to the design with a first evaluation circuit 24 and a separate second evaluation circuit 25, the floor treatment appliance 1 has two measuring loops, which can be evaluated independently of one another. Each evaluation circuit 24, 25 includes a separate measuring loop or a separate logic circuit, respectively.

Although only a few embodiments of the present invention have been shown and described, it is to be understood that many changes and modifications may be made thereunto without departing from the spirit and scope of the invention.

LIST OF REFERENCE NUMERALS 1 floor treatment appliance
2 appliance housing
3 drive means
4 detection means
5 computing means
6 surface
7 underside
8 fall sensor
9 fall sensor
10 fall sensor
11 fall sensor
12 fall sensor
13 fall sensor
14 fall sensor
15 fall sensor
16 slope
17 circumferential contour
18 straight connecting line
19 center of gravity region
20 projection
21 center of mass
22 cleaning element
23 wheel
24 first evaluation circuit
25 second evaluation circuit
a distance

What is claimed is:

1. An automatically moving floor treatment appliance (1) comprising:
   an appliance housing (2),
   a drive (3) for the movement of the floor treatment appliance (1) within a surrounding area,
   a detection means (4) for detecting surrounding area features within the surrounding area, the detection means comprising a plurality of fall sensors (8, 9, 10, 11, 12, 13, 14, 15) arranged on an underside (7) of the appliance housing (2) facing a surface (6), which are configured to detect a distance (a) of the floor treatment appliance (1) from the surface (6),
   a computing means (5) configured to transmit control commands to the drive (3), based on the surrounding area features detected by the detection means (4), and configured to control the drive (3) to change a movement of the floor treatment appliance (1) when the distance (a) detected by at least one of the fall sensors (8, 9, 10, 11, 12, 13, 14, 15) is greater than a threshold value defining a slope (16), wherein the plurality of fall sensors comprise a plurality of outer fall sensors (8, 9, 10, 11) arranged one behind the other in a direction of a circumferential contour (17) of the underside (7), and a plurality of inner fall sensors (12, 13, 14, 15), which, based on the arrangement of the outer fall sensors (8, 9, 10, 11), are offset inwards, wherein the fall sensors (8, 9, 10, 11, 12, 13, 14, 15) are interconnected in an evaluation circuit of the detection means (4) that is configured to evaluate the detection signals of the totality of inner fall sensors (12, 13, 14, 15) independently of the detection signals of the totality of outer fall sensors (8, 9, 10, 11), wherein the totality of inner fall sensors (12, 13, 14, 15) is integrated in a common first evaluation circuit (24) of the detection means (4), and wherein the totality of outer fall sensors (8, 9, 10, 11) is integrated in a common second evaluation circuit (25), which is formed separately from the first evaluation circuit.

2. The floor treatment appliance (1) according to claim 1, wherein the number of the inner fall sensors (12, 13, 14, 15) corresponds to the number of the outer fall sensors (8, 9, 10, 11).

3. The floor treatment appliance (1) according to claim 1, wherein the outer fall sensors comprise at least three outer fall sensors (8, 9, 10, 11) and the inner fall sensors comprise at least three inner fall sensors (12, 13, 14, 15).

4. The floor treatment appliance (1) according to claim 1, wherein each one of the inner fall sensors (12, 13, 14, 15) is spatially assigned to a corresponding one of the outer fall sensors (8, 9, 10, 11), based on a position on the underside (7) of the appliance housing (2), so that each inner fall sensor (12, 13, 14, 15) and the corresponding outer fall sensor (8, 9, 10, 11) form a sensor pair.

5. The floor treatment appliance (1) according to claim 4, wherein the computing means (5) is configured to stop movement of the floor treatment appliance (1) when the inner fall sensor (12, 13, 14, 15) of a sensor pair detects a slope (16), even though the outer fall sensor (8, 9, 10, 11) of the same sensor pair has not detected a slope (16) before.

6. The floor treatment appliance (1) according to claim 4, wherein the computing means (5) is configured to transmit an error signal to a user of the floor treatment appliance (1) when the inner fall sensor (12, 13, 14, 15) of a sensor pair detects a slope (16), while the outer fall sensor (8, 9, 10, 11) of the same sensor pair does not detect a slope (16).

7. The floor treatment appliance (1) according to claim 1, wherein the inner fall sensors (12, 13, 14, 15) are arranged on the underside (7) of the appliance housing (2) so that a straight connecting line (18) between two of the inner fall sensors (12, 13, 14, 15), which are arranged one behind the other in the direction of the circumferential contour (17), does not intersect and does not affect a center of gravity region (19) defined on the underside (7), which has a vertical projection (20) of a center of mass (21) of the floor treatment appliance (1) into a plane of the fall sensors (8, 9, 10, 11, 12, 13, 14, 15).

8. The floor treatment appliance (1) according to claim 7, wherein the center of gravity region (19) is formed in a circular manner and the center of mass (21) projected onto the underside (7) of the appliance housing (2) defines a center point of the circular center of gravity region (19).

\* \* \* \* \*